United States Patent [19]

Kim

[11] Patent Number: 5,161,016
[45] Date of Patent: Nov. 3, 1992

[54] METHOD OF INTERPOLATING AN IMAGE SIGNAL USING A SLOPE CORRELATION AND A CIRCUIT THEREOF

[75] Inventor: Jeong-Hoon Kim, Seoul, Rep. of Korea

[73] Assignee: Samsung Electronics Co., Ltd., Suwon, Rep. of Korea

[21] Appl. No.: 798,125

[22] Filed: Nov. 26, 1991

[30] Foreign Application Priority Data

Dec. 22, 1990 [KR] Rep. of Korea ............... 1990-21499

[51] Int. Cl.⁵ .................. H04N 5/208; H04N 7/01
[52] U.S. Cl. .................. 358/166; 358/140; 358/167
[58] Field of Search .................. 358/166, 37, 140, 11, 358/167, 160, 138

[56] References Cited

U.S. PATENT DOCUMENTS

| | | | |
|---|---|---|---|
| 4,706,113 | 11/1987 | Ito | 358/166 |
| 4,967,263 | 10/1990 | Dieterich | 358/140 |
| 5,057,921 | 10/1991 | Robert | 358/140 |
| 5,095,354 | 3/1992 | Sokawa | 358/140 |

Primary Examiner—James J. Groody
Assistant Examiner—Sherrie Hsia
Attorney, Agent, or Firm—Robert E. Bushnell

[57] ABSTRACT

A method for interpolating an image signal using a slope correlation and the circuit thereof, in order to improve a picture quality by enhancing a vertical resolution. A slope correlation interpolation depending on a correlation degree between picture elements is performed for an image signal of a low frequency component, and a line interpolation is performed for an image signal of a high frequency component. Therefore, a vertical resolution is improved and hardware is decreased.

5 Claims, 5 Drawing Sheets

METHOD OF INTERPOLATING AN IMAGE SIGNAL USING A SLOPE CORRELATION AND A CIRCUIT THEREOF

BACKGROUND OF THE INVENTION

The present invention relates to a method for interpolating an image signal in a processing apparatus of a digital image signal and a circuit thereof, and more particularly to a method for interpolating an image signal by using a slope correlation in two dimensions and a circuit thereof, in order to improve a picture quality by enhancing a vertical resolution.

In a processing of an image signal, it is a widely known fact that a digital processing method is superior to an analog processing method. Recently, in a television set or a video tape recorder (VTR), etc., an analog image signal is digitally processed by the analog to digital conversion and then the image signal is displayed on a screen by the digital to analog conversion. In this case, in order to improve a picture quality of the image signal, various interpolation methods are used. For example, an interlaced scanning method of 262.5 lines/field (525 lines/frame) is used in an NTSC, and a time difference between an odd field and an even field is 1/60 seconds. In the above time difference, the larger a screen is provided, the less vertical resolution is produced. This is because viewers come to sense a flicker phenomenon between lines. As a method for removing the flicker phenomenon, a line interpolation and a field interpolation have been used.

FIG. 1 is a block diagram of a conventional line interpolation circuit. A line interpolator 40 receiving an input image signal through an input terminal, generates a line interpolated signal. A scanning rate converter 80 receiving the line interpolated signal output from the line interpolator 40 and an input image signal, performs a non-interlace scanning. In this case, the image signal supplied through the input terminal is a digitally converted image signal. The line interpolator 40 delays the input image signal by one horizontal line and produces an interpolated image signal by averaging the delayed image signal and a next one horizontal line. That is, a 1H delay 40a is for delaying the input image signal by one horizontal line, an adder 40b is for adding the image signal of a current horizontal line to the image signal of a previous horizontal line and a multiplier 40c is for multiplying the added image signal by ½, to thereby perform a line interpolation. For example, if the image signal supplied to the 1H delay 40a in the line interpolator 40 is 8 bits data, the adder 40b produces 9 bits data. Therefore, the multiplier 40c multiplies the 9 bits data by ½, to thereby produce a line interpolated data of 8 bits. The input image signal of the input terminal and the line interpolated image signal output from the line interpolator 40 are applied to the scanning rate converter 80 to perform a non-interlace scanning. In this case, if the scanning period of one horizontal line is 63.5 $\mu$sec., the input image signal is produced for 63.5/2(31.75)$\mu$sec, and the line interpolated image signal is produced for 63.5/2(31.75)$\mu$sec.

However, the above-described line interpolation method has a problem in that a vertical resolution is deteriorated since the current horizontal line and the previous horizontal line are interpolated by averaging the lines. To solve the above problem, in case of a still picture, a field interpolation is performed by selecting a previous field value as an interpolation value. However, since the field interpolation necessitates a field memory, it has a disadvantage that hardware is increased. Moreover, in case of a motion picture, a line interpolation is performed by using an adaptive interpolation. However, it cannot sufficiently decrease the deterioration of the vertical resolution.

SUMMARY OF THE INVENTION

It is an object of the invention to provide a method for interpolating an image signal using a slope correlation in two dimensions and a circuit thereof, in order to improve a picture quality by enhancing a vertical resolution.

It is another object of the invention to provide a method for interpolating an image signal using a slope correlation in two dimensions and a circuit thereof, in order to decrease hardware.

According to an aspect of the present invention, a delay matching circuit 15 delays and adjusts for a given period an image signal of a horizontal line supplied through an input terminal, and a horizontal low-pass filter (LPF) 20 generates a slope correlation interpolation area signal under a predetermined cut-off frequency by passing a low frequency component of the image signal. A subtracter 30 receiving the signals output from the delay matching circuit 15 and the horizontal low-pass filter 20, generates a line interpolation area signal above the predetermined cut-off frequency, and a slope correlation interpolator 50 receiving the signal output from the horizontal low-pass filter 20, performs a slope correlation interpolation of an image signal having a high correlation degree between picture elements. A line interpolator 40 receiving the signal output from the subtracter 30, performs a line interpolation of an image signal between horizontal lines, and a first adder 60 adds the signal output from the subtracter 30 to the signal output from the horizontal low-pass filter 20. A second adder 70 adds a signal output from the line interpolator 40 to an output signal of the slope correlation interpolator 50 to generate a final interpolation image signal, and a scanning rate converter 80 receiving the image signal output from the first adder 60 and the final interpolated image signal output from the second adder 70 performs a non-interlace scanning.

According to another aspect of the present invention, a delay matching circuit 15 delays and adjusts for a given period an image signal of a horizontal line supplied through an input terminal, and a horizontal variable filtering unit 100 a variable slope correlation interpolation area signal under a predetermined cut-off frequency by variable-passing a low frequency component of the image signal by means of external selection terminals. A subtracter 30 receiving the signals output from the delay matching circuit 15 and the horizontal variable filtering unit 100, generates a line interpolation area signal above the predetermined cut-off frequency, and a slope correlation interpolator 50 receiving the signal output from the horizontal variable filtering unit 100, performs a slope correlation interpolation of an image signal having a high correlation degree between picture elements. A line interpolator 40 receiving the signal output from the subtracter 30, performs a line interpolation of an image signal between horizontal lines, and a first adder 60 adds the signal output from the subtracter 30 to the signal output from the horizontal variable filtering unit 100. A second adder 70 adds a signal output from the line interpolator 40 to an output signal of the slope correlation interpolator 50 to generate a final interpolation image signal, and a scanning rate converter 80 receiving the image signal output from the first adder 60 and the final interpolated image signal output from the second adder 70 performs a non-interlace scanning. The horizontal variable filtering unit 100 includes first to fourth horizontal low-pass filters 100a to 100d and a multiplexer 100e. The first to fourth horizontal low-pass filters 100a to 100d are respectively connected to the input terminal pass low frequency components of the image signals at respective different cut-off frequency. The multiplexer 100e is connected to the output terminals of the first to fourth horizontal low-pass filters 100a to 100d, has internal selection terminals S0 and S1 connected to external selection terminals A0 and A1 and produces a slope correlation interpolation area signal depending on a selection of the external selection terminals A0 and A1.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
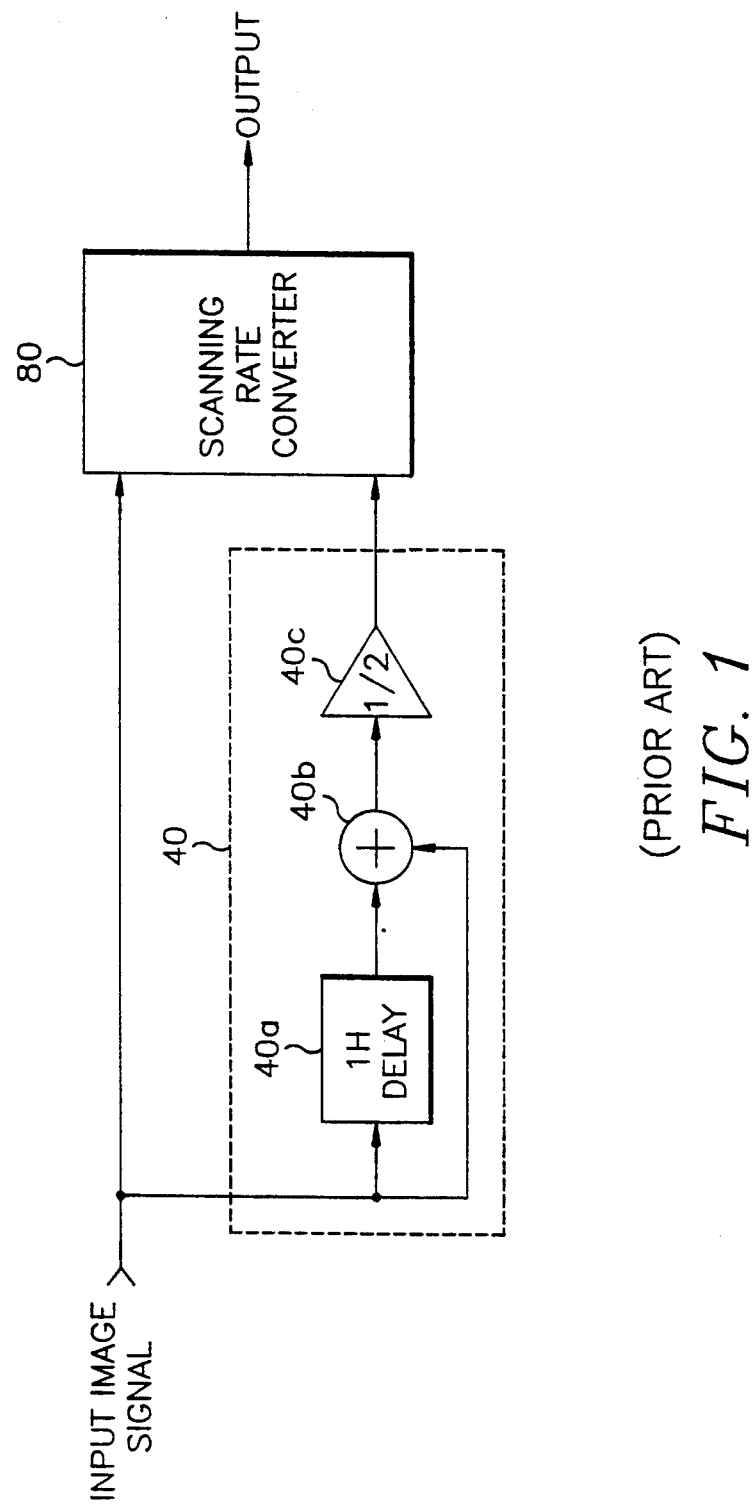
FIG. 1 is a schematic block diagram showing a conventional line interpolator.
Figure 2:
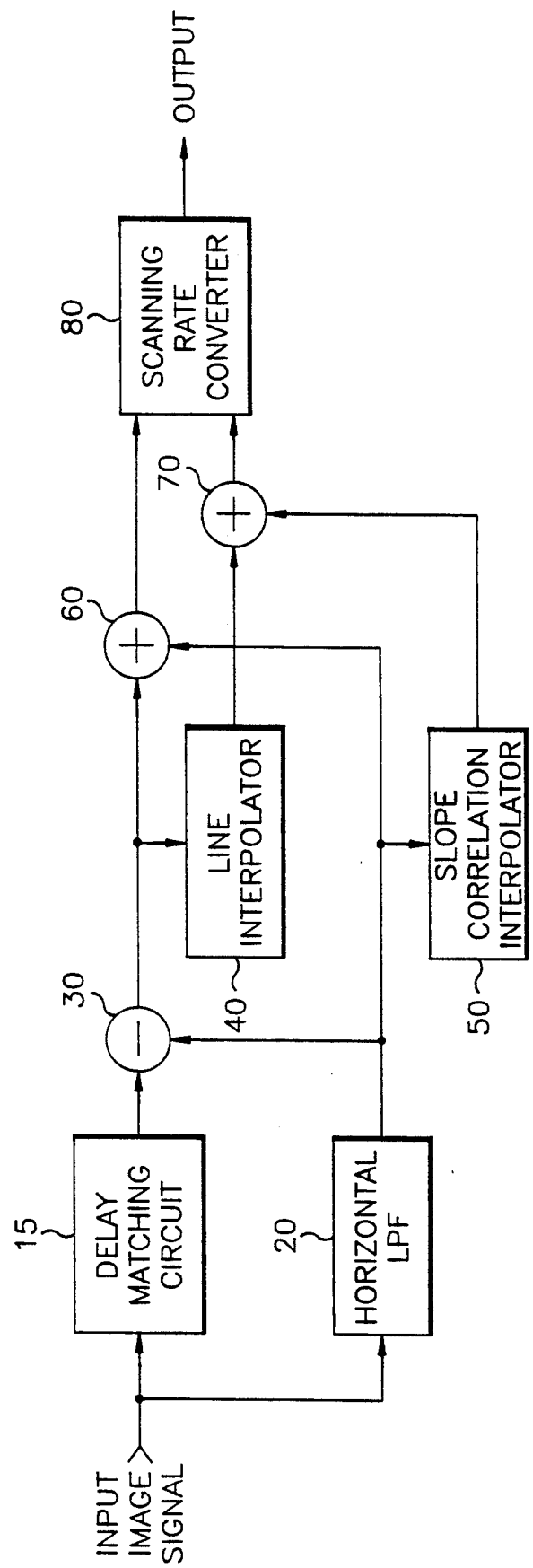
FIG. 2 is a schematic block diagram showing one embodiment according to the present invention.

Referring to FIG. 2, an image signal supplied through an input terminal is a digitally converted image signal of a horizontal line, and a delay matching circuit 15 delays the image signal for a predetermined period. In this case, the predetermined period is a time delayed by one horizontal line. A horizontal low-pass filter 20 passes a low frequency component of the image signal of the horizontal line and produces a slope correlation interpolation area signal under a predetermined cut-off frequency. The signal output from the horizontal low-pass filter 20 are subtracted from the delayed image signal output from the delay matching circuit 15 by a subtracter 30 which produces a line interpolation area signal above the predetermined cut-off frequency. The signal output from the subtracter 30 is applied to a line interpolator 40 for performing a line interpolation of the image signal between the horizontal lines. The process of the line interpolation of the line interpolator 40 is identical to that of the line interpolator 40 of FIG. 1. The signal output from the horizontal low-pass filter 20 is applied to a slope correlation interpolator 50 for performing a slope correlation interpolation of an image signal having a high correlation degree between picture elements. A first adder 60 adds the signal output from the subtracter 30 to the signal output from the horizontal low-pass filter 20. A second adder 70 adds the line interpolated image signal output from the line interpolator 40 to the slope correlation interpolated image signal output from the slope correlation interpolator 50. A scanning rate converter 80 receiving the signals output from the first and second adders 60, 70 converts a scanning rate for performing a non-interlace scanning.

Figure 3:
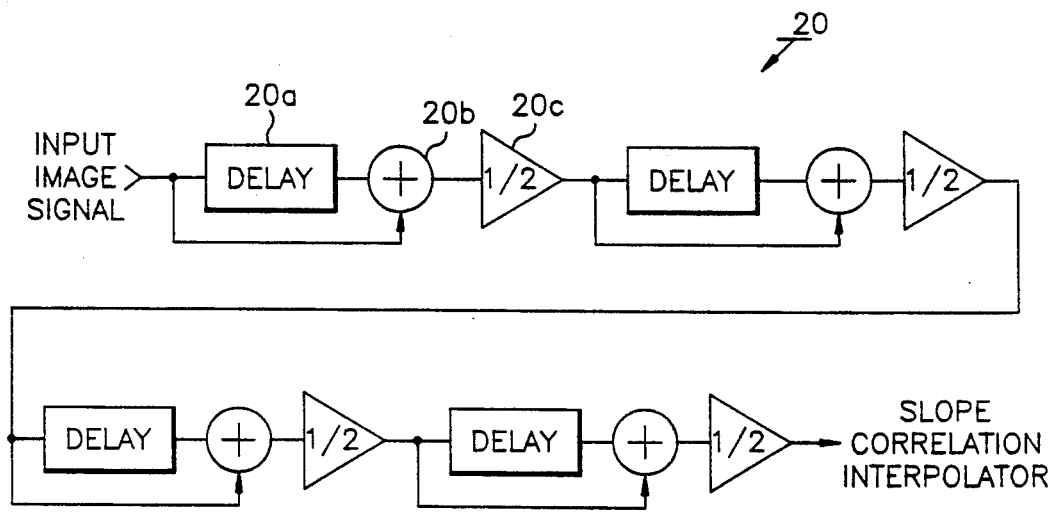
FIG. 3 is a diagram showing a horizontal low-pass filter 20 as shown in FIG. 2.

Referring to FIG. 3, the horizontal low-pass filter 20 of FIG. 2 is cascaded with four stages in order of a delay 20a, an adder 20b and a multiplier 20c and has a predetermined cut-off frequency. The slope correlation interpolation area and the line interpolation area are distinguished by a predetermined cut-off frequency. For example, if the predetermined cut-off frequency is 1.9 MHz, the area under 1.9 MHz is the slope correlation interpolation area and the area over 1.9 MHz is the line interpolation area. In this case, the horizontal low-pass filter 20 is not limited by the four stages and it can be constructed with the stages over or under four stages. Moreover, the delay 20a, adder 20b and multiplier 20c are general low-pass filters having a predetermined cut-off frequency.

Figure 4:
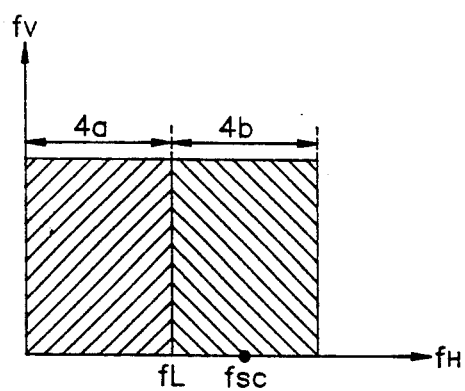
FIG. 4 is a diagram showing an interpolation area according to the present invention.

Referring to FIG. 4, when showing a horizontal frequency on an abscissa $f_H$ and a vertical frequency on an ordinate $f_V$, an area 4a is the slope correlation interpolation area and 4b is the line interpolation area. That is, the image signal of the horizontal line corresponding to the area 4a is processed by the slope correlation interpolation and the image signal of the horizontal line corresponding to the area 4b is performed by the line interpolation. A chrominance subcarrier frequency $f_{SC}$ is included in the area 4b of FIG. 4. In this case, a $f_L$ represents a cut-off frequency by means of the horizontal low-pass filter 20 of FIG. 2.

Figure 5:
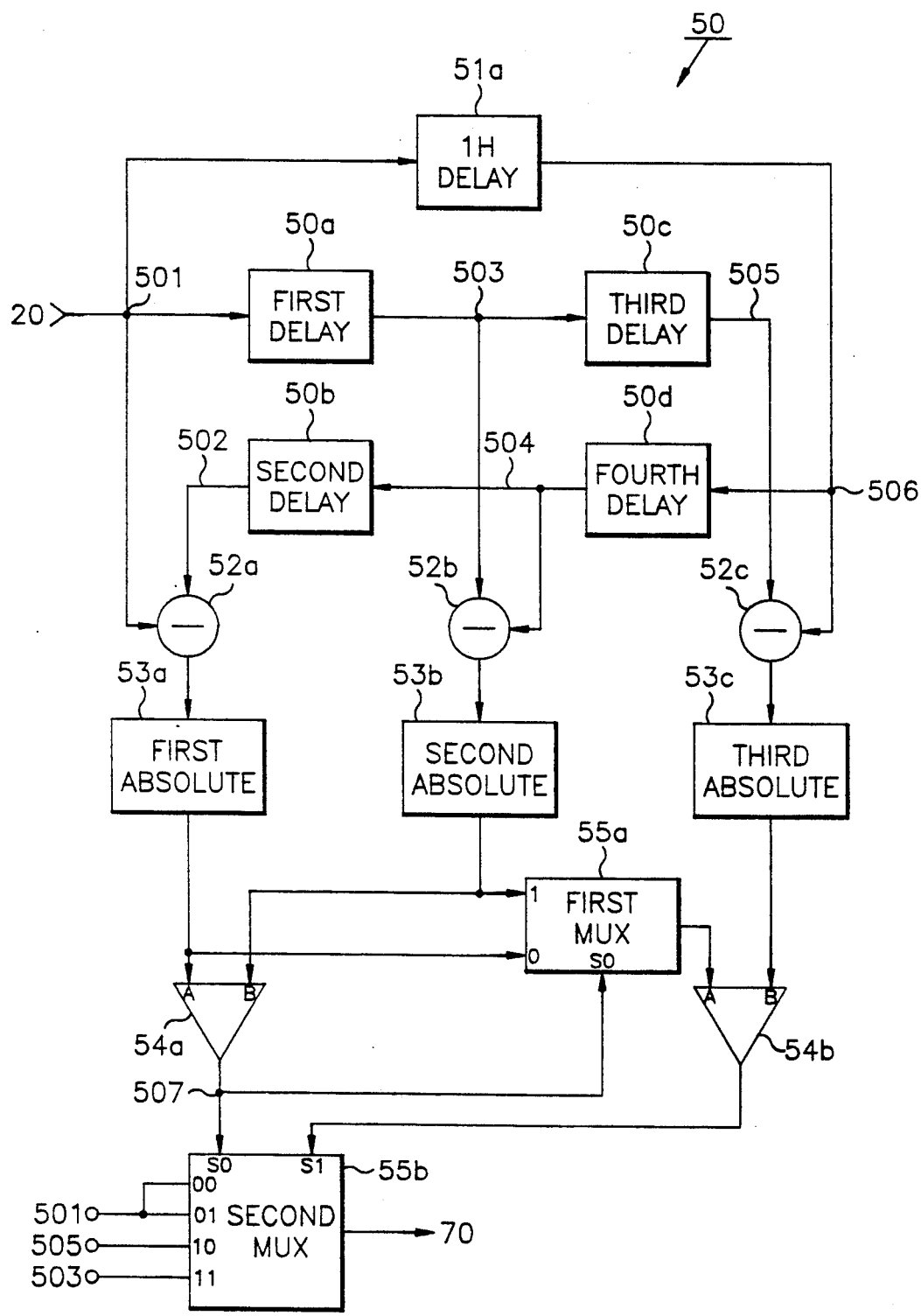
FIG. 5 is a diagram showing a slope correlation interpolator 50 as shown in FIG. 2.

Referring to FIG. 5, the horizontal line image signal output from the horizontal low-pass filter 20 of FIG. 2 is supplied to a node 501. The horizontal line image signal of the node 501 corresponds to the area 4a under the cut-off frequency $f_L$ of FIG. 4. A 1H delay 51a delays one horizontal line for the slope correlation interpolation. First to fourth delays 50a to 50d delay picture elements among one horizontal line as much as each picture element interval. That is, the delays 50a to 50d delay the picture elements within one horizontal line for the slope correlation interpolation. First to third subtracters 52a to 52c produce first to third subtraction signals, respectively. Namely, point-symmetrically paired picture elements in the upper and lower lines centering on a point (between picture elements of the node 503 and 504) to be interpolated, are subtracted from each other by the first to third subtracters 52a to 52c, respectively. The picture element of the node 501 is subtracted from the picture element of the node 502 by the first subtractor 52a, that of the node 503 is subtracted from that of the node 504 by the second subtractor 52b and that of the node 505 is subtracted from that of the node 506 by the third subtractor 52c. In first to third absolute value circuits 53a to 53c, the absolute values of the first to third subtraction signals output from the first to third subtracters 52a to 52c are obtained, and the lowest value among the three absolute values is acquired by means of first and second comparators 54a and 54b. A first multiplexer 55a respectively receives the signals output from the second and first absolute value circuits 53b and 53a through input terminals 1 and 0 thereof and the signal output the first comparator 54a through selection terminal S0 thereof. The first multiplexer 55a multiplexes the received signal to supply to the second comparator 54b. In this case, it is important to determine a condition of an inequality sign of the first and second comparators 54a and 54b in order to give priority. The signals output from the first and second comparators 54a and 54b are constructed to have the opposite condition. For example, if the condition of the first comparator 54a is B>A on the basis of A and B, the first comparator 54a produces 0, and if the condition is B≦A, the first comparator 54a produces 1. On the contrary, if the condition of the second comparator 54b is A>B, the second comparator 54b produces 0, and if the condition is A≦B, the second comparator 54b produces 1. Input terminals 00, 01, 10, 11 of a second multiplexer 55b receives the image signals of the node 501, 503, 505, respectively, and selection terminals S0 and S1 thereof receives the signal output from the first and second comparators 54a and 54b, in order to supply the slope correlation interpolated image signal to the second adder 70 of FIG. 2. The signals output from the first and second comparators 54a and 54b are applied to the selection terminals S0 and S1 of the second multiplexer 55b to generate the interpolated value corresponding to the least value. That is, if {503-504} is the least value, the second multiplexer 55b produces a value of (503+504)/2. Similarly, if {501-502} is the least value, (501+502)/2 is generated and if {505-506} is the least value, (505+506)/2 is produced through the second multiplexer 55b. Consequently, the slope correlation interpolator 50 receives the signal output from the horizontal low-pass filter 20 and performs the slope correlation interpolation of the image signal having a high correlation degree between picture elements.

Figure 6:
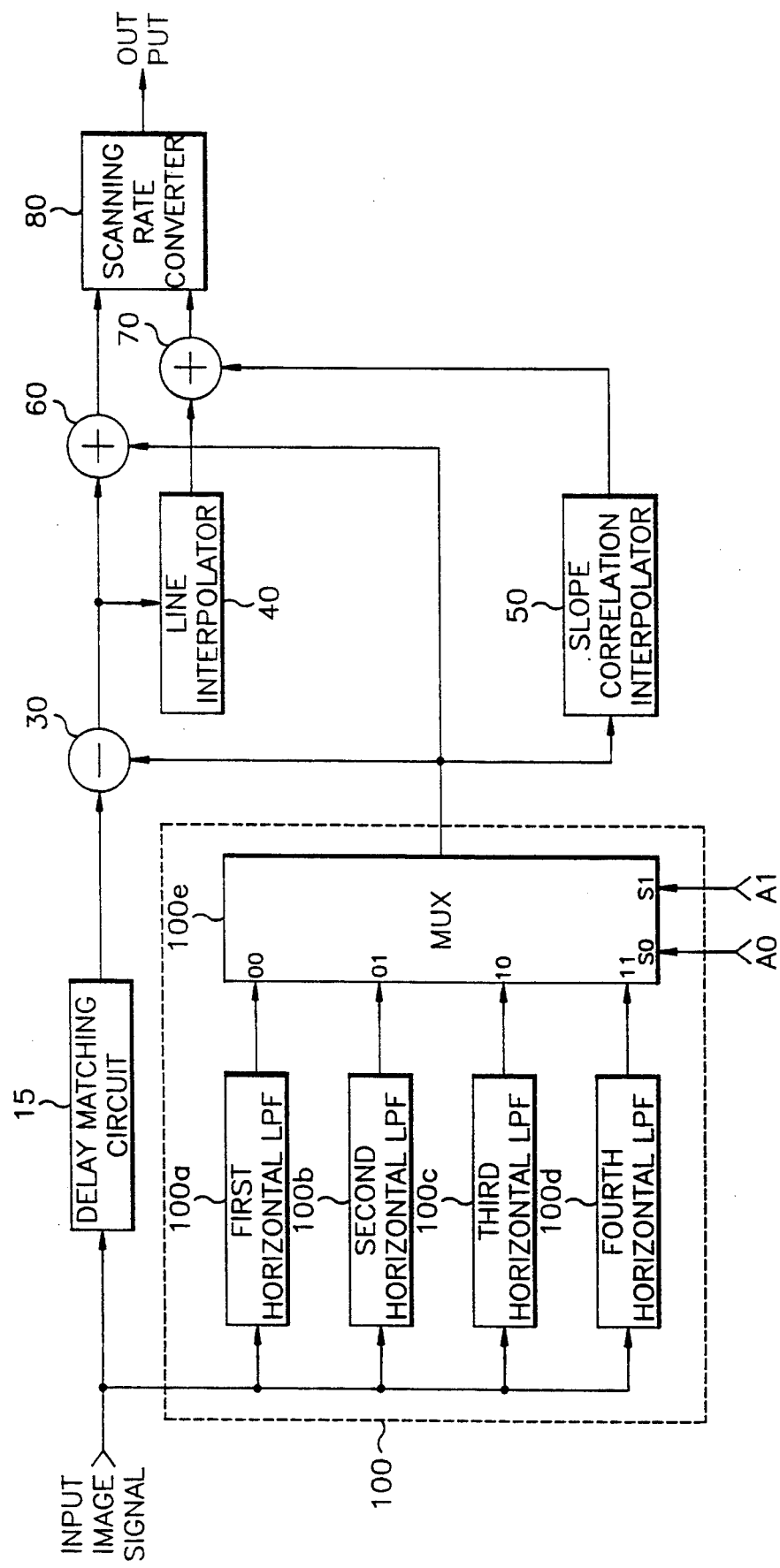
FIG. 6 is a schematic block diagram showing another embodiment according to the present invention.

Referring to FIG. 6, a horizontal low-pass filter 20 is improved so as to vary the slope correlation interpolation area by external selection terminals. That is, the area 4a of FIG. 4 is varied. Respective first to fourth horizontal low-pass filters 100a to 100d of a horizontal variable filtering unit 100 have a different cut-off frequency. Therefore, a slope correlation interpolation area signal selected by external selection terminals A0 and A1 connected to internal selection terminals S0 and S1 of a multiplexer 100e is interpolated by means of a slope correlation interpolator 50. In this case, the external selection terminals A0 and A1 can be selected by a user through a microprocessor.

The process of the slope correlation interpolation in two dimensions includes steps of delaying an image signal of a horizontal line for a predetermined period and filtering the image signal of the horizontal line to produce a slope correlation interpolation area signal under a predetermined cut-off frequency, producing a slope correlation interpolation signal by detecting a correlation degree between picture elements of the slope correlation interpolation area signal, producing a line interpolation area signal over the predetermined cut-off frequency by subtracting the filtered image signal from the delayed image signal, producing a line interpolation signal by line-interpolating the line interpolation area signal, adding the line interpolation area signal to the slope correlation interpolation area signal to generate a first added image signal and adding the line interpolation signal to the slope correlation interpolation signal to produce a second added image signal and performing a non-interlace scanning of the first and second image signals.

While the present invention has been particularly shown and described with reference to the preferred embodiment thereof, it will be understood by those skilled in the art that foregoing and other changes in form and details may be made without departing from the spirit and scope of the present invention.

What is claimed is:

1. A circuit for interpolating an image signal using a slope correlation for use in a digital image signal processing apparatus, comprising:
   delay matching means for delaying and adjusting for a given period an input image signal of a horizontal line supplied through an input terminal;
   horizontal low-pass filter means connected to said input terminal, for passing a low frequency component of said input image signal, to thereby generate a slope correlation interpolation area signal under a predetermined cut-off frequency;
   subtracter means connected to said delay matching means and said horizontal low-pass filter means, for subtracting said slope correlation interpolation area signal from a delayed signal through said delay matching means, to thereby generate a line interpolation area signal above said predetermined cut-off frequency;
   slope correlation interpolator means connected to said horizontal low-pass filter means, for interpolating an image signal having a high correlation degree between picture elements using a slope correlation;
   line interpolator means connected to said subtracter means, for line-interpolating an image signal between horizontal lines;
   first adder means connected to said subtracter means and said horizontal low-pass filter means, for adding said line interpolation area signal to said slope correlation interpolation area signal;
   second adder means connected to said line interpolator means and said slope correlation interpolator means, for adding a line interpolation signal output from said line interpolator means to a slope correlation interpolation signal output from said slope correlation interpolator means; and
   scanning rate converter means connected to said first and second adder means, for converting a scanning rate to perform a non-interlace scanning of image signals output from said first and second adder means.

2. The circuit as claimed in claim 1, wherein said slope correlation interpolator means is comprised of:
   1H delay means connected to said horizontal low-pass filter means, for delaying said slope correlation interpolation area signal output from said horizontal low-pass filter means, by one horizontal line;
   first delay means connected to said horizontal low-pass filter means, for delaying picture elements of said slope correlation interpolation area signal;
   third delay means connected to said first delay means, for delaying picture elements output from said first delay means;
   fourth delay means connected to said 1H delay means, for delaying picture elements of a delayed signal output from said 1H delay means;
   second delay means connected to said fourth delay means, for delaying picture elements output from said fourth delay means;
   first subtracter means connected between said horizontal low-pass filter means and said second delay means, for subtracting said slope correlation interpolation area signal from a signal output from said second delay means, to thereby produce a first subtraction signal;
   second subtracter means connected between said first delay means and said fourth delay means, for subtracting a signal output from said first delay means from a signal output from said fourth delay means, to thereby produce a second subtraction signal;

third subtracter means connected between said third delay means and said 1H delay means, for subtracting a signal output from said third delay means from a signal output from said 1H delay means, to thereby produce a third subtraction signal;

first to third absolute value circuit means connected to said first to third subtracter means, respectively, for making absolute values of said first to third subtraction signals, to thereby produce first to third absolute values;

first comparator means connected to said first and second absolute value circuit means, for comparing said first absolute value with said second absolute value, to thereby produce a first comparison value;

first multiplexer means connected to said first and second absolute value circuit means, for multiplexing said first and second absolute values according to said first comparison value;

second comparator means connected to said first multiplexer means and said third absolute value circuit means, for comparing said third absolute value with a signal output signal form said first multiplexer means, to thereby produce a second comparison value; and a second multiplexer connected to said first and second comparator means, for multiplexing the signals output from said low-pass filter means, said first delay means and said third delay means, according to said first and second comparison values.

3. A circuit for interpolating an image signal using a slope correlation for use in a digital image signal processing apparatus, comprising:

delay matching means for delaying and adjusting for a given period an input image signal of a horizontal line supplied through an input terminal;

horizontal variable filter means connected to said input terminal, for variable-passing a low frequency component of said input image signal, according to external selection signals, to thereby generate a variable slope correlation interpolation area signal under a predetermined cut-off frequency;

subtracter means connected to said delay matching means and said horizontal variable filter means, for subtracting said variable slope correlation interpolation area signal from a delayed signal through said delay matching means, to thereby generate a line interpolation area signal above said predetermined cut-off frequency;

slope correlation interpolator means connected to said horizontal variable filter means, for interpolating an image signal having a high correlation degree between picture elements using a slope correlation;

line interpolator means connected to said subtracter means, for line-interpolating an image signal between horizontal lines;

first adder means connected to said subtracter means and said horizontal variable filter means, for adding said line interpolation area signal to said variable slope correlation interpolation area signal;

second adder means connected to said line interpolator means and said slope correlation interpolator means, for adding a line interpolation signal output from said line interpolator means to a slope correlation interpolation signal output from said slope correlation interpolator means; and scanning rate converter means connected to said first and second adder means for converting a scanning rate to perform a non-interlace scanning of image signals output from said first and second adder means.

4. The circuit as claimed in claim 3, wherein said horizontal variable filter means is comprised of:

first to fourth horizontal low-pass filters connected to said input terminal, for passing a low frequency component of said image signal each having different cut-off frequency; and a multiplexer means connected to said first to fourth horizontal low-pass filters, for producing said variable slope correlation interpolation area signal according to said external selection signals.

5. A method for interpolating an image signal using a slope correlation for use in a digital image signal processing apparatus, comprising the steps of:

delaying an image signal of a horizontal line for a predetermined period and filtering said image signal of said horizontal line, to thereby produce a slope correlation interpolation area signal under a predetermined cut-off frequency;

producing a slope correlation interpolation signal by detecting a correlation degree between picture elements of said slope correlation interpolation area signal;

producing a line interpolation area signal over said predetermined cut-off frequency by subtracting said filtered image signal from said delayed image signal;

producing a line interpolation signal by line-interpolating said line interpolation area signal;

adding said line interpolation area signal to said slope correlation interpolation area signal:

adding said line interpolation signal to said slope correlation interpolation signal; and performing a non-interlace scanning.

* * * * *

UNITED STATES PATENT AND TRADEMARK OFFICE
CERTIFICATE OF CORRECTION

PATENT NO. : 5,161,016
DATED : November 3, 1992
INVENTOR(S) : Jeong-Hoon Kim

It is certified that error appears in the above-indentified patent and that said Letters Patent is hereby corrected as shown below:

Column 4, Line 36, After "for", insert --processing--:

IN THE CLAIMS

Column 7  Claim 2

Line 24, after "signal", change "form" to --from--;

Column 8  Claim 5

Line 50, after "signal", change colon " : " to semi-colon -- ; -- :

Signed and Sealed this

Twenty-first Day of November, 1995

Attest:

BRUCE LEHMAN

*Attesting Officer*   *Commissioner of Patents and Trademarks*